(12) United States Patent
Bethel et al.

(10) Patent No.: US 9,197,028 B2
(45) Date of Patent: Nov. 24, 2015

(54) LASER TUBE WITH BAFFLES

(71) Applicant: Synrad, Inc., Mukilteo, WA (US)

(72) Inventors: Jason W. Bethel, Seattle, WA (US);
Melvin J. Lima, Bothell, WA (US);
Yakov L. Litmanovich, Mountlake Terrace, WA (US)

(73) Assignee: Synrad, Inc., Mukilteo, WA (US)

( * ) Notice: Subject to any disclaimer, the term of this patent is extended or adjusted under 35 U.S.C. 154(b) by 0 days.

(21) Appl. No.: 14/276,595

(22) Filed: May 13, 2014

(65) Prior Publication Data

US 2014/0334510 A1 Nov. 13, 2014

Related U.S. Application Data

(60) Provisional application No. 61/822,562, filed on May 13, 2013.

(51) Int. Cl.
*H01S 3/00* (2006.01)
*H01S 3/038* (2006.01)
*H01S 3/03* (2006.01)
*H01S 3/223* (2006.01)

(52) U.S. Cl.
CPC ............... *H01S 3/038* (2013.01); *H01S 3/0315* (2013.01); *H01S 3/0385* (2013.01); *H01S 3/2232* (2013.01)

(58) Field of Classification Search
CPC ......... H01S 3/03; H01S 3/038; F04C 23/001; F04C 18/3564; F04C 23/008; F04C 29/023; F04C 2210/261; F04C 2230/231; F04C 2230/60; F04C 2240/30; F04C 2240/60; F04C 2240/601; F04C 2240/803; F04C 2240/806; F04C 2250/101
USPC .............................. 372/38.05, 29.013, 61, 87
See application file for complete search history.

(56) References Cited

U.S. PATENT DOCUMENTS

| | | | |
|---|---|---|---|
| 6,198,759 B1 | 3/2001 | Broderick et al. | |
| 6,603,794 B2 | 8/2003 | Bethel et al. | |
| 7,260,134 B2 * | 8/2007 | Shackleton et al. | ............ 372/87 |
| 7,263,116 B2 * | 8/2007 | Shackleton et al. | ............ 372/55 |

(Continued)

FOREIGN PATENT DOCUMENTS

| | | |
|---|---|---|
| DE | 10202159 A1 | 10/2003 |
| EP | 0371014 A1 | 6/1990 |

(Continued)

OTHER PUBLICATIONS

International Search Report issued in corresponding International Application No. PCT/US2014/037865 mailed on Sep. 4, 2014 (5 pages).

(Continued)

*Primary Examiner* — Colleen A Matthews
*Assistant Examiner* — Vu A Vu
(74) *Attorney, Agent, or Firm* — Osha Liang LLP

(57) ABSTRACT

The tube includes a first electrode having a first electrode inner surface and a second electrode having a second electrode inner surface. The first electrode is separated, in a first transverse direction, from the second electrode thereby defining a gap region having a gap thickness between the first electrode inner surface and the second electrode inner surface. The tube further includes a first and a second elongated baffle member, each having a respective elongated central channel formed in an inner surface thereof.

26 Claims, 6 Drawing Sheets

(56) References Cited

U.S. PATENT DOCUMENTS

| 7,970,038 | B2 | 6/2011 | Shackleton et al. |
| 2003/0058913 | A1 | 3/2003 | Shackleton et al. |
| 2005/0175054 | A1 | 8/2005 | Shackleton et al. |
| 2007/0195839 | A1 | 8/2007 | Monty et al. |
| 2009/0034574 | A1 | 2/2009 | Shackleton et al. |

FOREIGN PATENT DOCUMENTS

| WO | 89/00775 | A1 | 1/1989 |
| WO | 2009/017585 | A1 | 2/2009 |

OTHER PUBLICATIONS

Written Opinion of the International Searching Authority issued in PCT/US2014/037865 mailed on Sep. 4, 2014 (8 pages).

International Preliminary Report on Patentability issued in corresponding International Application No. PCT/US2014/037865, mailed Aug. 4, 2015 (28 pages).

* cited by examiner

LASER TUBE WITH BAFFLES

CROSS-REFERENCE TO RELATED APPLICATIONS

This Application claims priority, pursuant to 35 U.S.C. 119(e), to U.S. Provisional Application No. 61/822,562, filed on May 13, 2013, the contents of which is hereby incorporated by reference in its entirety.

BACKGROUND

A laser generates optical radiation (light) within a laser resonator (often referred to as a laser cavity). The optical radiation builds up within the laser resonator and eventually passes through a final optical surface (often referred to as the output coupler) of the resonator to propagate in space beyond the laser. Powerful lasers may be used for cutting, drilling, welding, marking, or engraving of materials. In particular, radio frequency (RF)-excited gas lasers produce laser energy when a gas medium within the laser is excited by the application of RF energy between a pair of electrodes. An example of a gas laser is a carbon dioxide ($CO_2$) laser.

The performance parameters of a laser, particularly RF-excited gas lasers, may generally be characterized by the laser power, power stability, and beam mode quality. Each of these performance parameters may be affected by one or more conditions within the laser itself. For instance, changing conditions of the gas within the electrodes of an RF-excited gas laser may affect the uniformity of the gas discharge within the electrodes. This then affects the $M^2$ (pronounced "M-squared") parameter, which is defined as the ratio of a beam parameter product (BPP) of an actual beam to that of an ideal Gaussian beam at the same wavelength (e.g., a "beam quality factor"). Changing conditions of the gas within the electrodes also may affect other laser beam features such as ellipticity and/or roundness. In pulsed gas lasers, particularly where unstable resonators are used, acoustic resonances within the laser structure can lead to these changing conditions within the electrodes and hence, to poor beam quality and/or poor power stability. Thus, the laser's ability to effectively perform its intended purpose often may be degraded.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a tube for a slab laser. The tube includes a first electrode having a first electrode inner surface and a second electrode having a second electrode inner surface. The first electrode is separated, in a first transverse direction, from the second electrode thereby defining a gap region having a gap thickness between the first electrode inner surface and the second electrode inner surface. The tube further includes a first and a second elongated baffle member, each having a respective elongated central channel formed in an inner surface thereof. The first and second elongated baffle members are disposed in the gap region along a first and a second longitudinal edge portion, respectively, of the first and the second electrode, respectively. The first and second elongated baffle members are disposed with their inner surfaces facing the gap region such that the inner surface of the first electrode, second electrode, first baffle member, and second baffle member cooperate to surround the gap region. The elongated central channels of the baffle members serve to extend the gap region in a second transverse direction by a depth of the elongated central channels thereby defining stand-off regions in the channels that extend along the length of the baffle members in the longitudinal direction.

Also, various embodiments of the present disclosure are directed to a tube for a slab laser that includes a first electrode having a first electrode inner surface and a second electrode having a second electrode inner surface. The first electrode is separated from the second electrode, in a first transverse direction, thereby defining a gap region having a gap thickness between the first electrode inner surface and the second electrode inner surface. The tube includes a first and a second elongated baffle member, each having a respective elongated central channel formed in an inner surface thereof. The first and second elongated baffle members are disposed in the gap region along a first and a second longitudinal edge portion, respectively, of the first and the second electrode, respectively. The first and second elongated baffle members are disposed with their inner surfaces facing the gap region such that the inner surface of the first electrode, second electrode, first baffle member, and second baffle member cooperate to surround the gap region. The first and the second elongated baffle members each include a cut out portion disposed along its length in the longitudinal direction.

Other aspects of the invention will be apparent from the following description and the appended claims.

DETAILED DESCRIPTION

Figure 1:
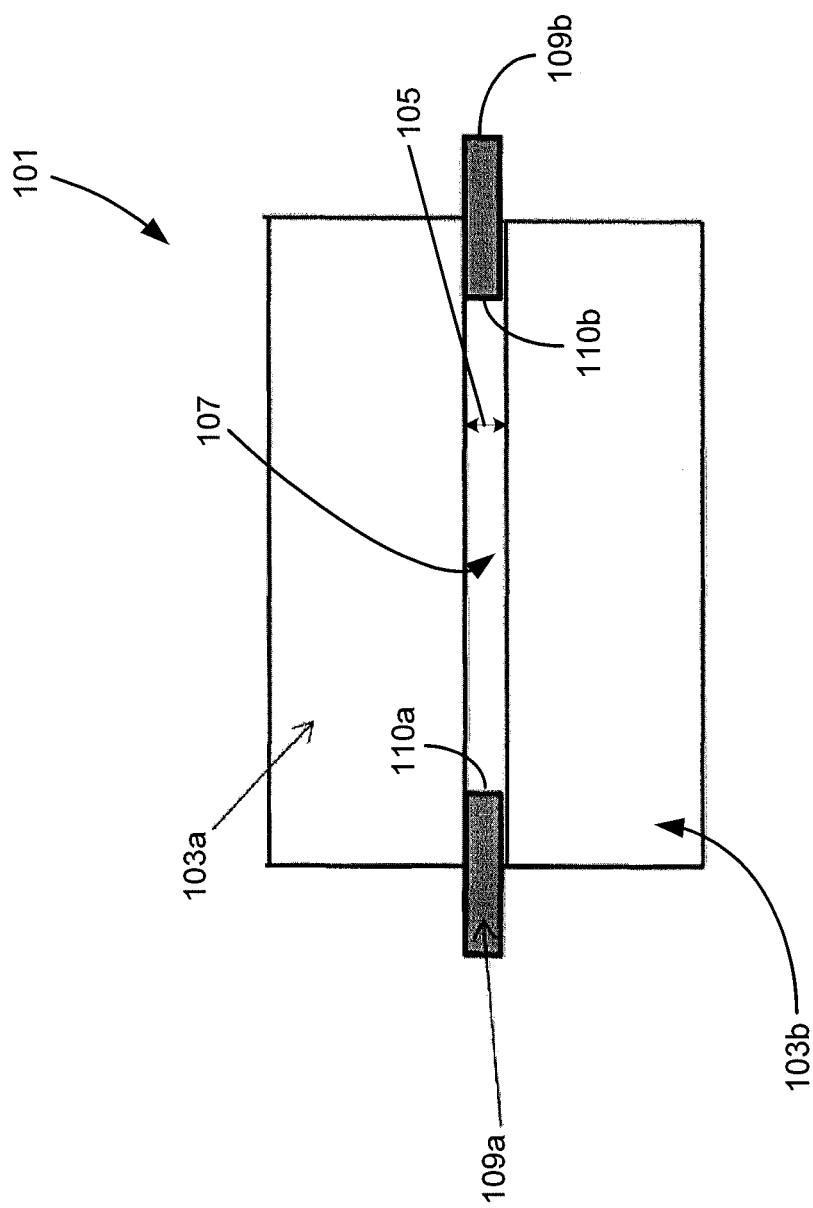
FIG. 1 shows a cross-sectional view of a prior art laser electrode structure that employs spacers.

Specific embodiments of a laser tube with baffles will now be described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of the laser tube with baffles. However, it will be apparent to one of ordinary skill in the art that these embodiments may be practiced without these specific details. In other instances, well-known features have not been described in detail to avoid unnecessarily complicating the description.

In general, the present disclosure is directed to a Radio Frequency (RF)-excited gas discharge laser (e.g., a slab laser). The laser includes a housing containing a laser gas, where a pair of elongated, planar electrodes are disposed within the housing and spaced apart to define a narrow gap corresponding to a discharge region. A laser resonator is defined by placing mirrors at the ends of the electrodes. The electrodes form a waveguide, or light guide, in one axis of the resonator and confine the lasing mode of the resonator in an axis perpendicular to the plane of the electrodes (the waveguide axis). The mirrors define the lasing mode in an axis parallel to the plane of the electrodes. This type of mirror arrangement is referred to in the art as an unstable resonator (or unstable resonant cavity) which operates in the long axis of the slab discharge region.

In accordance with one or more embodiments, the laser may be operated in a pulsed mode, particularly for drilling, cutting, etc. The pulse-repetition frequency (PRF) and the pulse duty-cycle may be selected according to the operation to be performed and according to the material on which the operation will be performed (e.g., PRF may typically range from less than 1 kilohertz (kHz) to over 100 kHz). As noted above, laser performance (e.g., output beam shape, discharge stability, etc.) can be affected at certain frequencies due to acoustic resonances, which may be caused by, among other things, perturbations in the gas discharge volume due to localized pressure variations in the gas.

FIG. 1 shows an electrode structure that employs dielectric spacers that are placed between, or otherwise along, the edges of the electrodes to enclose the discharge and to reduce acoustic coupling between the discharge region and the structures outside the discharge regions. The electrode structure 101 includes a pair of rectangular planar electrodes 103a and 103b (e.g., opposing "hot" electrode and "ground" electrode) separated by a small transverse gap region 105 (e.g., having a thickness between 1 mm and 5 mm) to define the discharge region 107. Electrodes 103a and 103b may be made from aluminum, though other materials may be used. In addition, dielectric spacers 109a and 109b may be positioned within the gap region 105 between the electrodes 103a and 103b. The dielectric spacers 109a and 109b may also extend along the length of the parallel electrodes, i.e., along a direction into the page (not shown). The inner edges of the spacers 109a and 109b extend up to the outer edges of the discharge region 107 and may also extend beyond the outer edges of the electrodes 103a and 103b. The spacers 109a and 190b may be made of a ceramic, such as alumina, or other non-electrically-conducting materials.

In the configuration shown in FIG. 1, the electrodes 103a and 103b and spacers 109a and 109b enclose the discharge volume such that when the structure is excited from an RF power source (not shown), the excited discharge creates laser light that is allowed to resonate within an optical cavity (not shown) and escape only through a final optical surface (creating an output beam resulting from laser radiation that escapes the unstable resonator as output radiation). A laser resonator in accordance with one or more embodiments is described in more detail below in reference to FIGS. 4A-4B.

Although the structure shown in FIG. 1 may be beneficial to reduce acoustic resonances, the outer edges of the discharge interacts with the inner edges 110a and 110b of the spacers 109a and 109b, respectively, and creates other problems, such as beam reflection, laser instability, and actually burning of the spacer, thus reducing the effectiveness and lifetime of the laser.

Figure 2A:
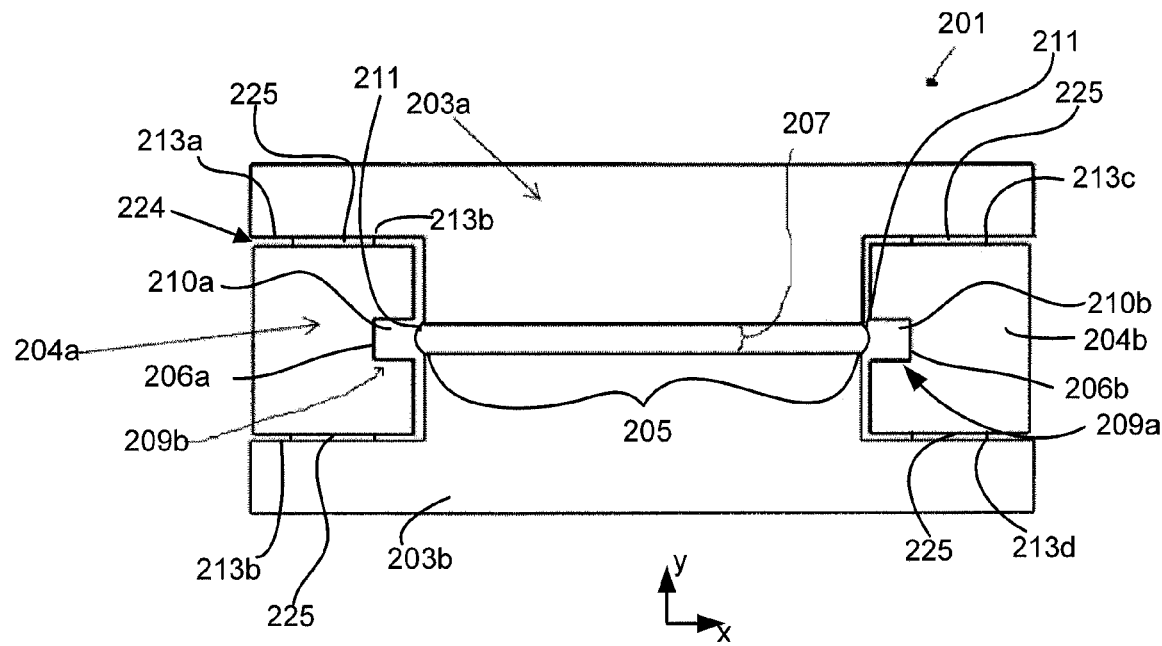
FIGS. 2A-2B show a cross-sectional view of a laser electrode structure separated by baffles in accordance with one or more embodiments of the invention.

FIG. 2A shows a cross-sectional view of a laser tube with baffles in accordance with one or more embodiments of the invention. The electrode structure 201 includes a pair of rectangular planar electrodes 203a and 203b each having respective recessed shelf-shaped outer end portions 213a, 213b, 213c, 213d. Disposed within the recessed shelf-shaped outer end portions 213a, 213b, 213c, 213d is a pair of baffles 204a and 204b that separate the electrodes 203a and 203b. The two parallel elongated electrodes 203a and 203b are shown in cross-section and are separated by a discharge region 205 having a width defined by the gap 207 (e.g., having a width of 0.5 mm-6 mm depending on the RF frequency employed).

In accordance with one or more embodiments, baffles 204a and 204b run along the length (not shown) of the electrodes 203a and 203b. The baffles 204a and 204b further include a central channel 209a and 209b, respectively, formed on their respective inner surfaces. The central channels run along the lengths of the baffles 204a and 204b and provide stand-off regions 210a and 210b, respectively. The stand-off regions 210a and 210b prevent any stray discharge and/or peripheral laser radiation 211 from discharge region 205 from coming into contact with the inner surfaces 206a and 206b of baffles 204a and 204b, respectively. In addition, the stand-off regions 210a and 210b minimize glancing reflections from the baffles by the peripheral laser radiation 211 that might extend slightly from the edges of the discharge region 205 and into the standoff regions 210a and 210b. The prevention of these glancing reflections prevents the generation of higher order laser modes in the laser cavity. In accordance with one or more embodiments, the size of the channels 209a and 209b may be such that there is little or no discharge (and little or no stray electric field) found within the channels 209a and 209b and/or stand-off regions 210a and 210b. In accordance with one or more embodiments, the transverse vertical sizing (i.e., the width in the y-direction) of the channels 209a and 209b may be equal to or greater than the width of the gap 207 of discharge region 205 so that any interaction of the optical field with the channels is minimized, and to also prevent the desired optical field from within the discharge region 205 from being affected by the presence of the baffles 204a and 204b. The transverse horizontal sizing (in the x-direction) of the depth of the channels 209a and 209b may be some fraction, or multiple, of the width of the gap 207, e.g., between 1 mm and 5 mm for a 2.5 mm electrode gap.

Figure 2B:
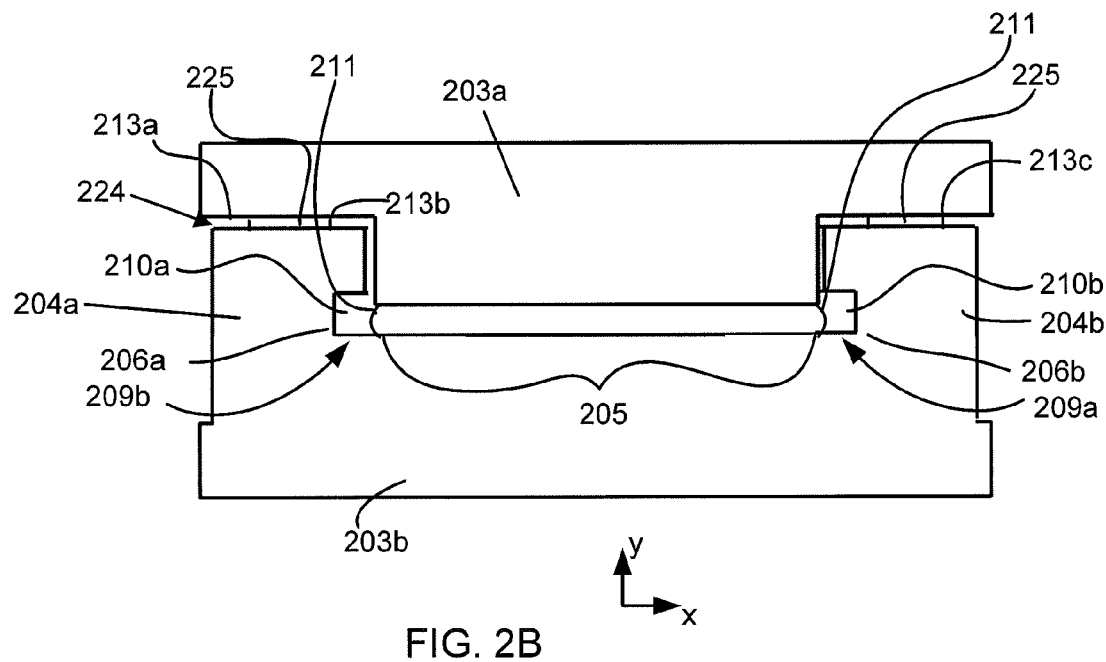
Figure 3A:
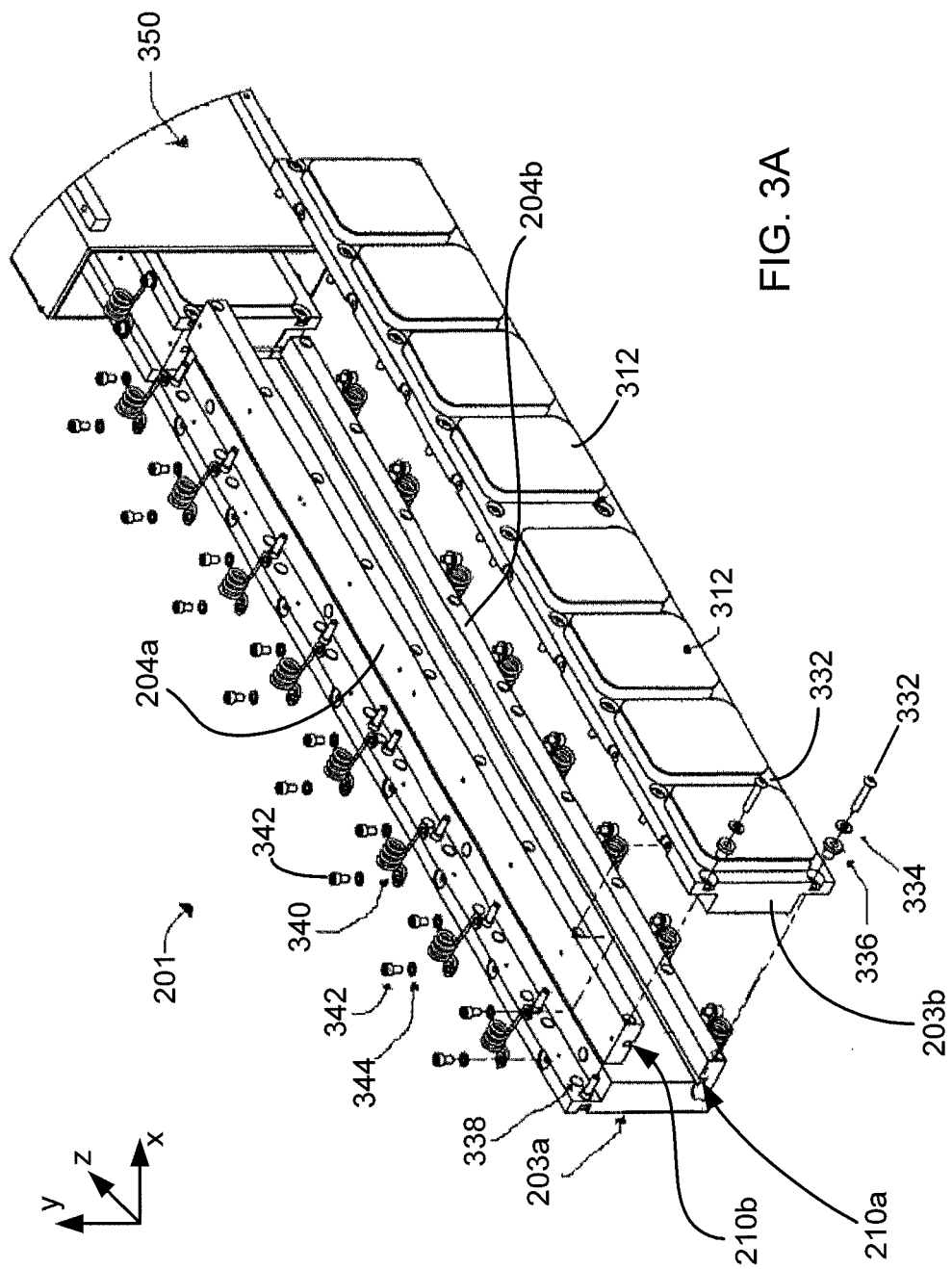
FIGS. 3A-3B show expanded perspective views of a laser electrode structure separated by baffles in accordance with one or more embodiments of the invention.
Figure 3B:
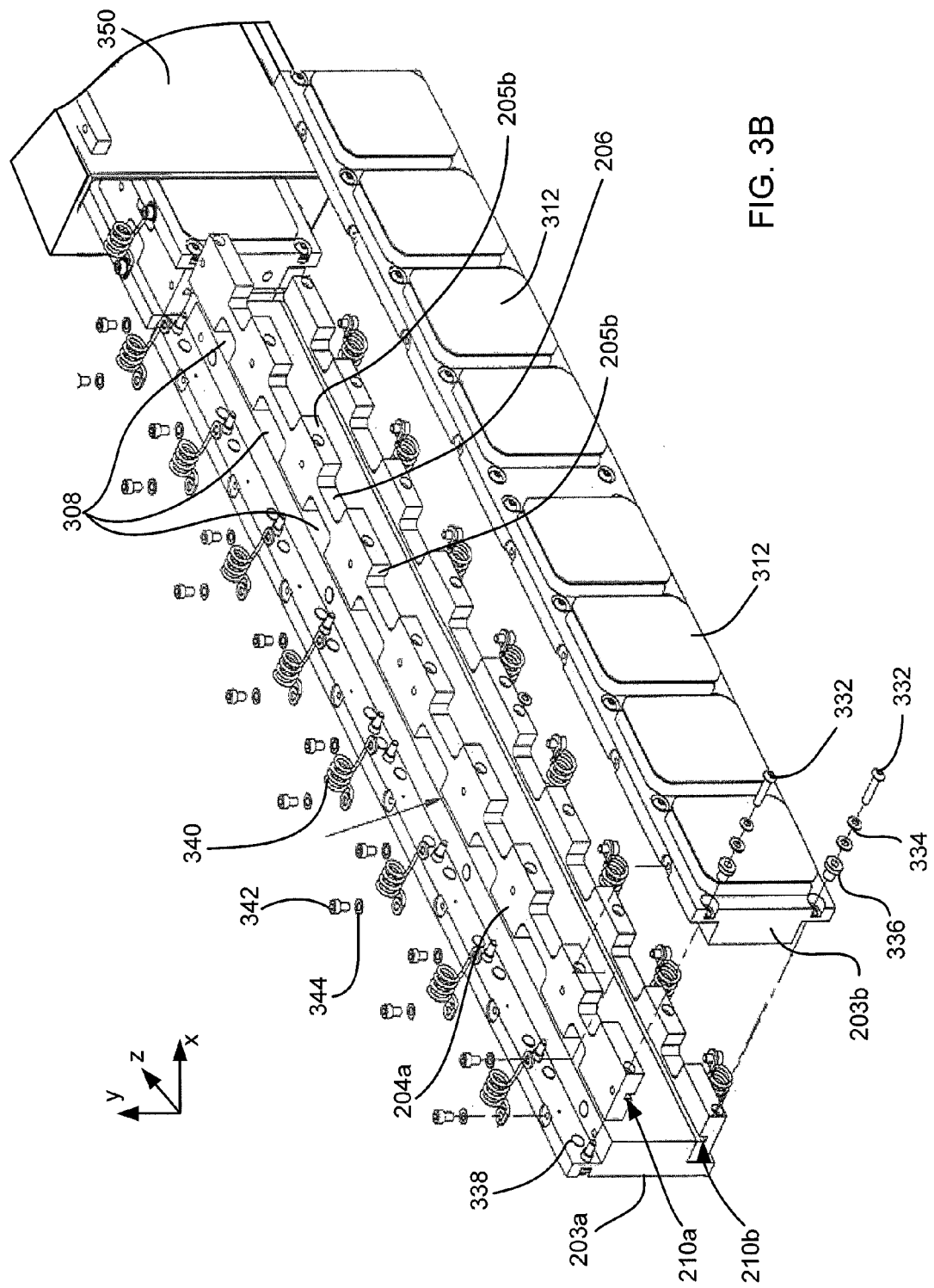

In accordance with one or more embodiments, the electrodes 203a and 203b may be secured to the baffles with screws, as shown in, e.g., FIGS. 3A-3B and the screws may be electrically isolated from the electrodes by non-conducting shoulder washers (not shown). Furthermore, in accordance with one or more embodiments, the baffles 204a and 204b may be formed from a conducting material and may be separated from the sides of the electrodes 203a and 203b by non-conducting spacers 225 such that the space 224 between the baffles and the electrode is less than around 0.02 inches. In accordance with one or more embodiments, the spacers may be 0.005-0.050 inches thick. A small gap 224 of this magnitude can prevent discharge from occurring between the electrodes 203a, 203b and the baffles 204a, 204b, while also preventing the gas used for the lasing medium from escaping the discharge region 205. In accordance with one or more embodiments the baffles 204a and 204b may be separated on either side by the non-conducting spacers 225 as shown in FIG. 2A. However, in embodiments that employ one grounded electrode, the baffles 204a and 204b the gap regions may not be necessary and the baffles 204a and 204b may directly contact the grounded electrode. Furthermore, as shown in FIG. 2B, in accordance with one or more embodiments, the baffles 204a and 204b and electrode 203b may be formed as a single integrated piece without departing from the scope of the present disclosure.

FIG. 3A shows a partially exploded perspective view of the electrode structure 201 of FIG. 2, in accordance with one or more embodiments of the invention. In particular, elongated rectangular electrodes 203a and 203b are shown with ceramic sheets 312 to provide heat conduction from the electrodes 203a and 203b to a laser housing 350. Also, an example implementation using dielectric (e.g., ceramic) disk shaped spacers 338 are shown between the electrodes 203a and 203b and baffles 204a and 204b (e.g., to set the width of the space 224 in FIG. 2A). In the embodiment shown in FIG. 3A, the baffles 204a and 204b are uniform thickness, elongated rectangular bar-shaped structures each having a respective central channel 210a and 210b formed in a respective inner surface. The central channels 210a and 210b also run along the lengths, in the longitudinal (z) direction, of the baffles 204a and 204b. In addition, screws 332 are shown to secure the electrodes 203a and 203b to the baffles 204a and 204b, including washers 334 and corresponding non-conducting shoulder washers 336 to electrically isolate the baffles 204a and 204b from the electrodes 203a and 203b. Note that the mechanical and electrical relationship between the electrodes and baffles shown herein, and other suitable measures may be implemented, such as pass-through bolts without departing from the scope of the present disclosure.

Furthermore, inductors 340 may be spaced down the length of both sides of the two electrodes 203a and 203b and connected across the two electrodes to insure uniform voltage excitation and thereby uniform discharge excitation down the length of the two electrodes. The inductors 340 may be connected using, for example, screws 342 and washers 344 to allow electrical contact to both electrodes. In accordance with one or more embodiments, the housing 350 encapsulates the entire laser system once assembled.

FIG. 3B shows another partially exploded perspective view of the electrode structure 201 of FIG. 2A, in accordance with one or more embodiments of the invention. More specifically, all the elements of FIG. 3B are the same as in FIG. 3A, except for the shape of the baffles 204a and 204b. Like the baffles of FIG. 3A, these baffles are designed generally as elongated rectangular bars each having a central channel 210a and 210b formed along the length of their respective inner surfaces. The baffles of FIG. 3B differ from the baffles of FIG. 3A in that the baffles of FIG. 3B have several cut-outs 308, or voids along the length. In other words, the baffles 204a and 204b of FIG. 3B are formed from two or more rectangular sub-members 205a and 205b that are connected by way of an elongated bridge member 206. The embodiment shown in FIG. 3B is formed from 9 rectangular sub-members connected by 8 bridge members. However, any number, and any shape of sub-members and bridge members may be used without departing from the scope of the present disclosure.

In accordance with one or more embodiments, the modified baffles of FIG. 3B provide for acoustic resonance prevention benefit of the solid, uniform width baffles of FIG. 3A, but also allow for a modification and/or tuning of the capacitance between the electrodes 203a and 203b based on the size and shape of the cut-outs. Because the capacitance C between two electrodes separated by a distance d is given by $$C = \varepsilon_r \varepsilon_0 \frac{A}{d},$$

where $\varepsilon_r$ is the relative permittivity of the material between the plates, $\varepsilon_0$ is a constant known as the vacuum permittivity, and A is the area of overlap between the two plates, the addition of one or more cutouts in the baffle may affect the capacitance between the electrodes. Generally speaking, a lower capacitance between the electrodes is achieved relative to the uniform width baffle by adding one or more cut-out portions 308 to the uniform width baffles. A lower capacitance generally results in improved laser pulsing performance.

Optical components located at the ends of the laser system (as well as other features, such as coolant components) are not shown here for the sake of clarity, though they are described in further detail below in reference to FIGS. 4A-4B. Also, the size, number, and location of the components (e.g., the inductors, screws, etc.) are merely illustrative, and not meant to limit the scope of the invention.

Figure 4A:
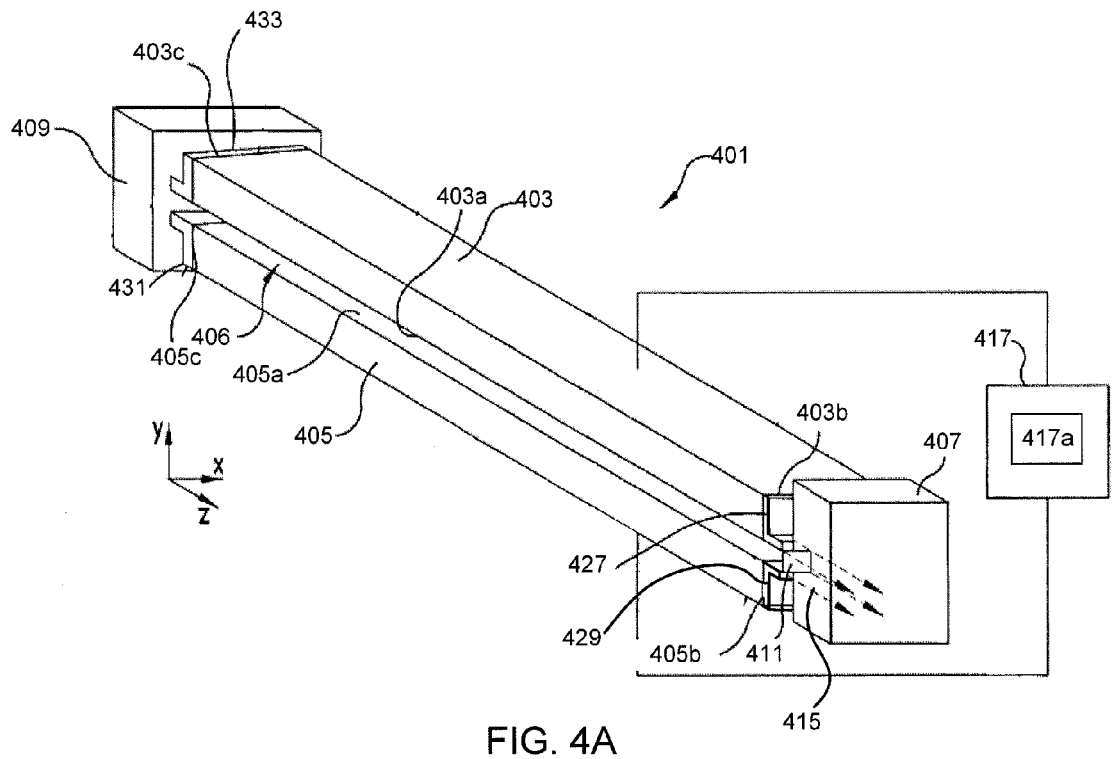
FIGS. 4A-4B show an expanded perspective view of a laser resonator structure and a top view of a laser resonator, respectively, in accordance with one or more embodiments of the invention.

FIG. 4A shows an example of a laser employing a laser resonator (also referred to herein as a laser cavity), in accordance with one or more embodiments. More specifically, FIG. 4A shows one example of laser employing a laser resonator, e.g., a slab gas laser 401. However, other types of laser resonators may be employed without departing from the scope of the present invention. Furthermore, while the examples described herein may show resonator designs of a certain type, a resonator of any design may be used without departing from the scope of the present invention, e.g., an unstable resonator. As already described above in reference to FIGS. 3-4, in accordance with one or more embodiments, the inter-electrode gap 406 is at least partially filled with a laser gain medium that serves as a discharge region. In accordance with one or more embodiments, the discharge region is defined to be the space between the inner surfaces 403a and 405a of the elongated electrodes 403 and 405, respectively. In accordance with one or more embodiments, the inner surfaces 403a and 405a serve as two elongated resonator walls that bound the discharge region in a transverse direction, and, in some embodiments, may also serve as waveguiding surfaces for the intra-cavity laser beam in this transverse direction (y-direction). While the example shown in FIG. 4A is a slab laser that employs planar electrodes 403 and 405, any electrode shape is possible without departing from the scope of the present disclosure. For example U.S. Pat. No. 6,603,794, incorporated by reference herein in its entirety, discloses a number of different electrode arrangements, e.g., contoured electrodes, tapered electrodes, and/or annular electrodes may be used.

The slab laser 401 shown in FIG. 4A further includes an optical resonator that is formed between the output coupling mirror 411 and front cavity mirror 407, with the folding mirror 409 used to fold the cavity as shown. In accordance with one or more embodiments, a pair of spherical and/or cylindrical mirrors may be used for the front cavity mirror 407 and folding mirror 409, respectively, and in general a transmitting window may be used for the output coupling mirror 411. However, other embodiments may use spherical optics, cylindrical optics, toroidal optics, or generally aspherical optics, or any combinations thereof for the resonator without departing from the scope of the present disclosure. In addition, in accordance with one or more embodiments, the optics may be mounted to end flanges (not shown) that maintain vacuum integrity while at the same time providing suitable adjustment of the mirror tilt to enable optimum alignment of the constituent mirrors of the optical resonator. In accordance with one or more embodiments, the entire slab laser assembly may be placed within a housing, such as housing 350 shown in FIGS. 3A-3B.

In the slab laser example shown in FIG. 4A, the elongated electrodes 403 and 405 are part of an electrical resonator (which itself is part of the laser resonator) such that the inter-electrode gap bounded by the resonator surfaces 403a and 405a serves as a discharge region for the gas lasing medium. In accordance with one or more embodiments, the tube design shown and described above in reference to FIGS. 2-3 may be employed. In accordance with one or more embodiments, such electrodes may have lengths of up to 1 meter, widths of up to 0.5 meters, and inter-electrode gaps on the order of 0.5-6 mm. However, other embodiments may use dimensions outside this range without departing from the scope of the present disclosure. In accordance with one or more embodiments, when radio frequency (commonly referred to as "RF") power is applied to the gas lasing medium via elongated electrodes 403 and 405, a gas discharge forms within the inter-electrode gap 406. In accordance with one or more embodiments, laser energy builds up within one or more modes, including a fundamental mode, of the optical resonator, eventually forming an intra-cavity laser beam (not shown) that travels back and forth between the output coupling mirror 411 and front cavity mirror 407 via rear folding mirror 409. Some fraction of the intra-cavity laser beam is transmitted through the output coupling mirror 411 and forms output laser beam 415.

In the illustrative embodiment shown in FIG. 4A, the electrical resonator cavity, and consequently the gas discharge area, may be rectangular shaped. However, alternative embodiments may employ a square, annular, or other electrical resonator cavities. The resonator surfaces 403a and 405a may be bare electrode surfaces or may also be plated electrode surfaces. Suitable materials for bare embodiments include metals such as aluminum and other metallic alloys. Plated embodiments may employ a ceramic material, such as alumina or beryllia, on the electrode surfaces.

As alluded to above, in accordance with one or more embodiments, the inter-electrode gap region (or inner cavity region) may be filled with a gas lasing medium. For example, the gas lasing medium may be a mixture of one part carbon dioxide ($CO_2$), one part nitrogen ($N_2$), and three parts helium (He), with the addition of 5% xenon (Xe). The gas pressure may be maintained in a range of approximately 30-150 Torr, e.g., 90 Torr. However, other embodiments may use higher pressures without departing from the scope of the present disclosure. Other embodiments of the invention may use other types of gas lasers, examples of which are listed in Table 1.

TABLE 1

| Type of Laser | Gas Lasing Medium |
| --- | --- |
| Carbon Dioxide | Some mixture of He, $N_2$, $CO_2$ and other gases such as Xe, $O_2$, and $H_2$. |
| Carbon Monoxide | Some mixture of He, $N_2$, CO, and other gases such as Xe, $CO_2$, $O_2$, and $H_2$. |
| Helium Cadmium | Some mixture of including He: Cd, including other inert gases |
| HeNe Lasers | Some mixture of He, Ne, including other inert gases |
| Krypton Ion Lasers | Some mixture of Kr, He, including other inert gases |
| Argon Ion Lasers | Some mixture of Ar, He, including other inert gases |
| Xenon | Xe, including other inert gases |
| Argon Xenon Lasers | Some mixture of Ar, Xe, He |
| Copper Vapor Laser | He/Ne + copper vapor (metal at high temp) + traces of other gases including $H_2$ |
| Barium Vapor Laser | He/Ne + Barium vapor |
| Strontium Vapor Laser | He/Ne + Strontium vapor |
| Metal Vapor Laser | Almost any metal vapor will lase given the right mixture of gases, temperature, and excitation conditions |
| Metal Halide Vapor Lasers | Almost all the above metals will also lase in their respective halide compounds, at lower temperatures, under slightly different excitation conditions |

TABLE 1-continued

| Type of Laser | Gas Lasing Medium |
| --- | --- |
| Excimer lasers | XeCl, XeF, ArF |
| Chemical lasers | HF, DF |
| Atmospheric lasers | Atmospheric gas |
| Nitrogen lasers | $N_2$, plus others |
| Sulphur, Silicon | Vapors of these elements |
| Iodine, Bromine, Chlorine | Vapors of these elements |
| COIL | Chemical Oxygen Iodine Laser |

Other gas mixtures may be used as well. For instance, some embodiments may use the following gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases, examples of which are listed in Table 1 above, at various other gas pressures, e.g., 30-120 Torr, e.g., 50 Torr; however, it will be appreciated that other gaseous lasing media may also be employed. For instance, one example of a lasing medium includes one or more of the following vapors: copper, gold, strontium, barium, a halide compound of copper, a halide compound of gold, a halide compound of strontium, a halide compound of barium, and other vapors, examples of which are identified but not limited to those shown in Table 1 above.

Returning to FIG. 4A, in accordance with one or more embodiments, the slab laser 401 includes a power supply 417 that supplies excitation energy to the gas lasing medium located within gap 406 via the first and second elongated electrodes 403 and 405, respectively. Accordingly, the addition of excitation energy causes the gas lasing medium to emit electromagnetic radiation in the form of laser beam 415 that ultimately exits the optical resonator by way of output coupling window or optical element 411. Included with the power supply 417 is a radio frequency generator 417a that generates the excitation energy to be applied to the first and second elongated planar electrodes 403 and 405. In accordance with one or more embodiments, the radio frequency generator may operate at a frequency of 40 MHz with an output power level of at least 3000 W. Other embodiments may use other excitation frequencies and power levels without departing from the scope of the present disclosure. Furthermore, in accordance with one or more embodiments, the radio frequency generator may be connected to the electrodes in a bi-phase fashion such that the phase of the voltage on one of the first and second elongated planar electrodes 403 and 405 is shifted substantially 180 degrees relative to the voltage on the other of the first and second elongated planar electrodes 403 and 405. The bi-phase excitation may be accomplished by any technique known in the art, e.g., by the placement of inductors between the first and second electrodes, both of which are isolated from ground. In accordance with one or more alternative embodiments, the radio frequency generator may be connected to one of the first and second elongated planar electrodes, such that only one of the first and second elongated planar electrodes is excited and the other is electrically grounded.

The excitation energy supplied by the power supply 417 in the embodiment shown in FIG. 4A may be radio frequency energy, but may also be associated with microwave, pulsed, continuous wave, direct current, or any other energy source that may suitably stimulate a lasing medium into producing laser energy.

In accordance with one or more embodiments, the inner surfaces 403a and 405a of the first and second elongated planar electrodes 403 and 405, respectively, are positioned sufficiently close to each other so that the inter-electrode gap acts as a waveguide along the y-axis for the laser radiation. Accordingly, when acting as waveguide surfaces, the inner surfaces 403a and 405a also act as optical resonator surfaces in the transverse direction (y-direction). In accordance with one or more embodiments, waveguiding occurs when $\pi N<1$, where $N=D^2/(4\lambda L)$ is the Fresnel number of the guide and D is the width of the gap between the electrodes, L is the length of the optical cavity, and $\lambda$ is the wavelength of the laser radiation. For a wavelength of about 10.6 microns, which is a common wavelength produced by a $CO_2$ laser, the waveguiding criterion is satisfied if the inter-electrode gap is less than 2 mm for a guide length of 40 cm. However, in other embodiments, the inter-electrode gap is large enough to allow for free space propagation, e.g., Gaussian beam propagation, of the laser beam in the y-direction. Accordingly, in this free space configuration, these surfaces serve to define the thickness of the gas discharge region without acting as a waveguide for the laser radiation. Other embodiments may use an inter-electrode gap width that is between the waveguiding criterion and complete free space propagation. In accordance with one or more embodiments, one or more extension members 427, 429 and 431, 433 that are arranged near or at the ends 403b, 405b and 403c, 405c, respectively of the resonator walls 403 and 405. Furthermore, in the embodiments that follow, the resonator walls and/or the surfaces of the extension members may or may not constitute waveguide walls and thus may also be used in freespace-unstable resonators as well as hybrid waveguide resonators. The extension members may help prevent damage to the optics and may also reduce power losses.

Figure 4B:
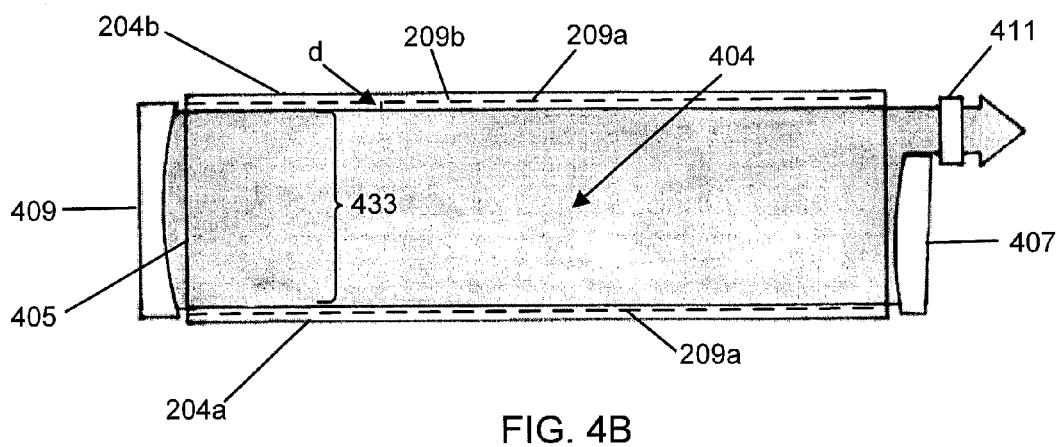

FIG. 4B shows a simplified top view of an unstable slab laser resonator that may be used as the optical resonator discussed above in reference to FIGS. 2-3 and 4A. In the slab resonator 401, an intra-cavity laser beam 404 (depicted by the shaded area in FIG. 4B) passes multiple times through a lasing medium (not shown, but as described above, may be, e.g., a $CO_2$ gas), thereby forming the optical resonator. As described above in reference to FIGS. 2-4A, the planar electrodes (only the bottom electrode 405 is visible in FIG. 4B) sandwich two elongated baffle members 204a and 204b (see also cross-sections shown in FIGS. 2A-2B) located on the longitudinal edge portions of the electrodes. In accordance with one or more embodiments, the elongated baffle members also include respective elongated central channels 209a and 209b that each extend a depth d into the inner surface of the respective baffle member (see also cross-sections of FIGS. 2A-2B). Accordingly, as described above in reference to FIGS. 2A-2B, the volume of the elongated central channels 209a and 209b forms a stand-off region that separates the discharge region from the inner surfaces of the baffle members. As also described above in reference to FIGS. 2A-2B, the elongated planar electrodes are designed in such a way that the discharge region is limited to the central region 433 of the electrodes, e.g., the central portion of the electrodes may be thicker than the longitudinal edge portions, forming an essentially T-shaped cross-section, as shown in FIGS. 2A-2B. Thus, while the gaseous lasing medium may be allowed to move into and out of the stand-off regions formed in the central channels 204a and 204b, no lasing or discharge will occur in those stand-off regions because the gap between the inner electrode surfaces is too large.

The lack of gas discharge in stand-off regions serves to both protect the inner surfaces of the baffle members and to improve the laser mode quality by minimizing the glancing reflections of the intra-cavity laser beam off of the inner surfaces of the baffle members. For example, in the case of an unstable resonator, the intra-cavity laser beam 404 may fill the entire volume of the optical resonator and may also extend slightly outside of the optical resonator. Thus, baffle members with no central channel and thus, no stand-off region would allow multiple glancing reflections of the intra-cavity laser beam off of the inner surface of the baffle members. The use of central channels having a depth d allows for the inner surface of the baffle member to be effectively moved outside of the optical resonator and also outside of the peripheral area of the optical resonator where a peripheral portion of the intra-cavity laser beam may be present. Thus, depending on the design of the resonator, the depth d of the elongated central channels is chosen to be large enough ensure that the inner surface of the elongated baffle member does not interact with (i.e., reflect) the intra-cavity laser beam. For example the width of the depth d may be 1 mm-20 mm, but depths outside of this range may be used without departing from the scope of the present disclosure.

Figure 5:
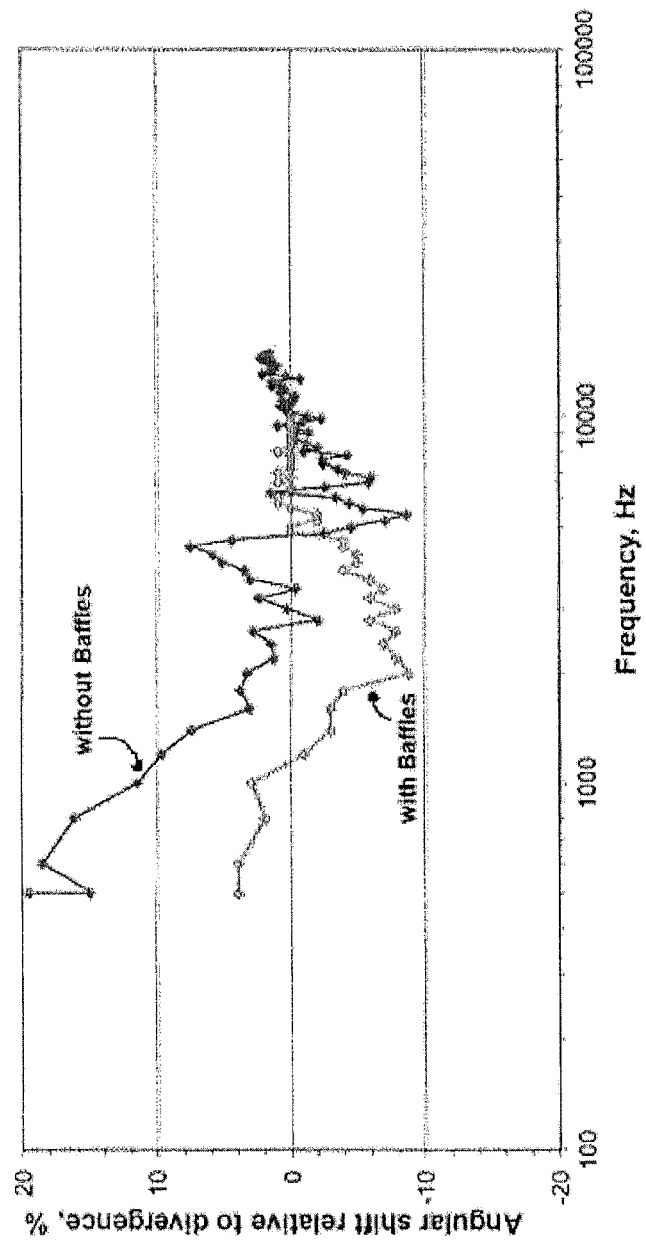
FIG. 5 shows a plot of the position of the laser beam (angular shift) with respect to the frequency of input RF pulses to the laser (laser pulse frequency) when using baffles in accordance with one or more embodiments of the invention.

The embodiments of the present invention as described herein may thus be used to improve the laser performance, e.g., to improve laser beam pointing stability, defined as the movement of the beam as a function of the operating frequency of the laser and also to improve beam quality. FIG. 5 shows a comparison plot showing the beam pointing stability for the case of a laser with baffles in accordance with one or more embodiments (e.g., FIGS. 2 and 3) and for the case without such baffles (e.g., FIG. 1). The plot clearly shows a dramatic reduction in the movement of the beam (by a factor of about 2) for a laser employing baffles in accordance with one or more embodiments. In addition, the minimization of movement also improves the quality of the laser beam and minimizes any effect of beam movement on the laser users application.

Additionally, the embodiments herein avoid the use of a long, thin ceramic spacer, like spacers 109a and 109b shown in FIG. 1, which can be difficult to manufacture and are susceptible to breakage (increasing the manufacturing cost of such prior art lasers). Further, the design of the electrodes 110 herein allow for efficient surface polishing due to their generally flat surfaces (e.g., the electrodes 303a and 303b have a generally T-shaped cross-section).

It is noted that various non-limiting embodiments described herein may be used separately, combined, or selectively combined for specific applications. Further, some of the various features of the above non-limiting embodiments may be used to advantage without the corresponding use of other described features. The foregoing description should therefore be considered as merely illustrative of the principles, teachings and illustrative embodiments of this invention, and not in limitation thereof. It is to be understood that the above-described arrangements are only illustrative of the application of the principles of the present invention. For example, the relative dimensions shown herein are merely illustrative, and may change based on the desired laser power levels, the RF frequency, gas composition, pressure, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A tube for a slab laser comprising:
   a first electrode comprising a first electrode inner surface;
   a second electrode comprising a second electrode inner surface, wherein the first electrode is separated, in a first transverse direction, from the second electrode thereby defining a gap region having a gap thickness between the first electrode inner surface and the second electrode inner surface;

a first and a second elongated baffle member, each comprising a respective elongated central channel formed in an inner surface thereof;

wherein the first and second elongated baffle members are disposed in the gap region along a first and a second longitudinal edge portion, respectively, of the first and the second electrode, respectively; and wherein the first and second elongated baffle members are disposed with their inner surfaces facing the gap region such that the inner surface of the first electrode, second electrode, first baffle member, and second baffle member cooperate to surround the gap region;

wherein the elongated central channels of the baffle members serve to extend the gap region in a second transverse direction by a depth of the elongated central channels thereby defining stand-off regions in the channels that extend along the length of the baffle members in the longitudinal direction;

wherein inner surfaces of the baffle members cooperate to reduce acoustic oscillations of a gaseous lasing medium disposed in the gap region; and wherein the elongated central channel of each baffle member runs along the length of an inner surface of the bridge members, and wherein the inner surfaces of the elongated central channels cooperate to reduce acoustic oscillations of a gaseous lasing medium disposed in the gap region.

2. The tube of claim 1, further comprising a discharge region that is disposed within a central portion of the gap region, wherein the stand-off regions are disposed between outer edges of the discharge region and inner surfaces of the baffle members and the stand-off region does not support a gas discharge.

3. The tube of claim 1, wherein the stand-off regions are disposed between peripheral portions of an intra-cavity laser beam and inner surfaces of the baffle members thereby preventing glancing reflections of the laser radiation from the inner surfaces of the baffle members.

4. The tube of claim 2, wherein a thickness of the first elongated electrode is larger in the discharge region than along the first and second longitudinal edge portions.

5. The tube of claim 4, wherein the thickness of the gap region in the discharge region is smaller than the thickness of the gap along the first and second longitudinal edge portion.

6. The tube of claim 5, wherein the first and second longitudinal edge portions of the first elongated electrode are recessed shelf surfaces.

7. The tube of claim 6, wherein the recessed shelf surfaces are adapted to receive the baffle members that disposed between the first elongated electrode and the second elongated electrode.

8. The tube of claim 1, wherein a thickness, in the first transverse direction, of the first elongated baffle member is constant along a length, in the longitudinal direction, of the elongated baffle member.

9. The tube of claim 1, wherein the first elongated baffle member comprises a cut-out portion disposed along its length in the longitudinal direction.

10. The tube of claim 1, wherein the first elongated baffle member comprises a plurality of cut out portions disposed along its length in the longitudinal direction.

11. The tube of claim 1, wherein the first elongated baffle member comprises a plurality of rectangular members interconnected by a plurality of bridge members, wherein a thickness in the first transverse direction of the plurality of rectangular members is larger than a thickness of the interconnecting bridge members in the first transverse direction.

12. The tube of claim 1, wherein elongated baffle members are formed from a conducting material.

13. The tube of claim 1, wherein elongated baffle members are formed from aluminum.

14. The tube of claim 1, wherein elongated baffle members are formed from a ceramic.

15. The tube of claim 13, wherein the elongated baffle members are separated from the elongated electrodes by way of a ceramic spacer.

16. The tube of claim 1, wherein the first and the second elongated baffle members are an integrated part of the first elongated electrode.

17. The tube of claim 1, wherein elongated baffle members are formed from an insulting material.

18. A tube for a slab laser comprising:
a first electrode comprising a first electrode inner surface;
a second electrode comprising a second electrode inner surface,
wherein the first electrode is separated from the second electrode, in a first transverse direction, thereby defining a gap region having a gap thickness between the first electrode inner surface and the second electrode inner surface;
a first and a second elongated baffle member, each comprising a respective elongated central channel formed in an inner surface thereof;
wherein the first and second elongated baffle members are disposed in the gap region along a first and a second longitudinal edge portion, respectively, of the first and the second electrode, respectively; and
wherein the first and second elongated baffle members are disposed with their inner surfaces facing the gap region such that the inner surface of the first electrode, second electrode, first baffle member, and second baffle member cooperate to surround the gap region; and
wherein the first and the second elongated baffle members each comprise a cut out portion disposed along its length in the longitudinal direction,
wherein inner surfaces of the baffle members cooperate to reduce acoustic oscillations of a gaseous lasing medium disposed in the gap region, and
wherein the elongated central channel of each baffle member runs along the length of an inner surface of the bridge members, and wherein the inner surfaces of the elongated central channels cooperate to reduce acoustic oscillations of a gaseous lasing medium disposed in the gap region.

19. The tube of claim 18, wherein the elongated central channels of the baffle members serve to extend the gap region in a second transverse direction by a depth of the elongated central channels thereby defining stand-off regions in the channels that extend along the length of the baffle members in the longitudinal direction.

20. The tube of claim 19, wherein the first elongated baffle member comprises a plurality of cut out portions disposed along its length in the longitudinal direction.

21. The tube of claim 20 wherein the first elongated baffle member comprises a plurality of rectangular members interconnected by a plurality of bridge members, wherein a thickness in the first transverse direction of the plurality of rectangular members is larger than a thickness of the interconnecting bridge members in the first transverse direction.

22. The tube of claim 18, wherein the thickness of the gap region adjacent to the central portion is smaller than the thickness of the gap region along the first and second longitudinal edge portion.

23. The tube of claim 19, wherein the first and second longitudinal edge portions of the first elongated electrode are recessed shelf surfaces.

24. The tube of claim 20, wherein the recessed shelf surfaces are adapted to receive the baffle members that disposed between the first elongated electrode and the second elongated electrode.

25. The tube of claim 18, wherein elongated baffle members are formed from an insulting material.

26. The tube of claim 18, wherein elongated baffle members are formed from a conducting material.

* * * * *

UNITED STATES PATENT AND TRADEMARK OFFICE
CERTIFICATE OF CORRECTION

PATENT NO.       : 9,197,028 B2                                               Page 1 of 1
APPLICATION NO.  : 14/276595
DATED            : November 24, 2015
INVENTOR(S)      : Jason W. Bethel et al.

It is certified that error appears in the above-identified patent and that said Letters Patent is hereby corrected as shown below:

In the claims,
    At column 12, claim number 17, line number 21, the word "insulting" should read
-- insulating --
    At column 13, claim number 25, line number 16, the word "insulting" should read
-- insulating --

Signed and Sealed this
Thirty-first Day of May, 2016

Michelle K. Lee
*Director of the United States Patent and Trademark Office*